(12) United States Patent
Whiter

(10) Patent No.: US 12,441,081 B2
(45) Date of Patent: Oct. 14, 2025

(54) MOULDING MATERIAL

(71) Applicant: HEXCEL COMPOSITES LIMITED, Duxford (GB)

(72) Inventor: Mark Whiter, Saffron Walden (GB)

(73) Assignee: HEXCEL COMPOSITES LIMITED, Duxford (GB)

( * ) Notice: Subject to any disclaimer, the term of this patent is extended or adjusted under 35 U.S.C. 154(b) by 112 days.

(21) Appl. No.: 17/770,015

(22) PCT Filed: Sep. 23, 2020

(86) PCT No.: PCT/EP2020/076515
§ 371 (c)(1),
(2) Date: Apr. 18, 2022

(87) PCT Pub. No.: WO2021/099010
PCT Pub. Date: May 27, 2021

(65) Prior Publication Data
US 2022/0388274 A1    Dec. 8, 2022

(30) Foreign Application Priority Data

Nov. 20, 2019  (GB) ........................... 1916917

(51) Int. Cl.
*B32B 5/26*    (2006.01)
*B32B 5/02*    (2006.01)
(Continued)

(52) U.S. Cl.
CPC .............. *B32B 5/266* (2021.05); *B32B 5/022* (2013.01); *B32B 5/08* (2013.01); *B32B 5/10* (2013.01);
(Continued)

(58) Field of Classification Search
CPC ........... B32B 5/266; B32B 5/022; B32B 5/08; B32B 5/10; B32B 7/09; B32B 27/12;
(Continued)

(56) References Cited

U.S. PATENT DOCUMENTS 7,267,868 B2 *  9/2007  Gallet ................... B29C 35/002
                                                                428/137

FOREIGN PATENT DOCUMENTS

EP    2711170 A1    3/2014
GB    2445929 A     7/2008
(Continued)

OTHER PUBLICATIONS

C. N. A. Jafaar, I. Zainol and O. O. Aremu, Effect of Silica Fillers on Mechanical Properties of Epoxy/Kenaf Composites, Dec. 13, 2017, IOP Publishing, Journal of Physics: Conference Series, vol. 1082, obtained from https://iopscience.iop.org/issue/1742-6596/1082/1 (Year: 2017).*

(Continued)

*Primary Examiner* — Brian Handville
(74) *Attorney, Agent, or Firm* — W. Mark Bielawski

(57) ABSTRACT

The present invention is concerned with a moulding material comprising: a) A primary non-woven fibre layer; b) A secondary non-woven fibre layer, and c) A resin layer; wherein the resin layer bonds the secondary non-woven fibre layer to a first surface of the primary non-woven fibre layer, and the resin layer is exposed on the second surface of the primary non-woven layer.

3 Claims, 2 Drawing Sheets

Figure 1:
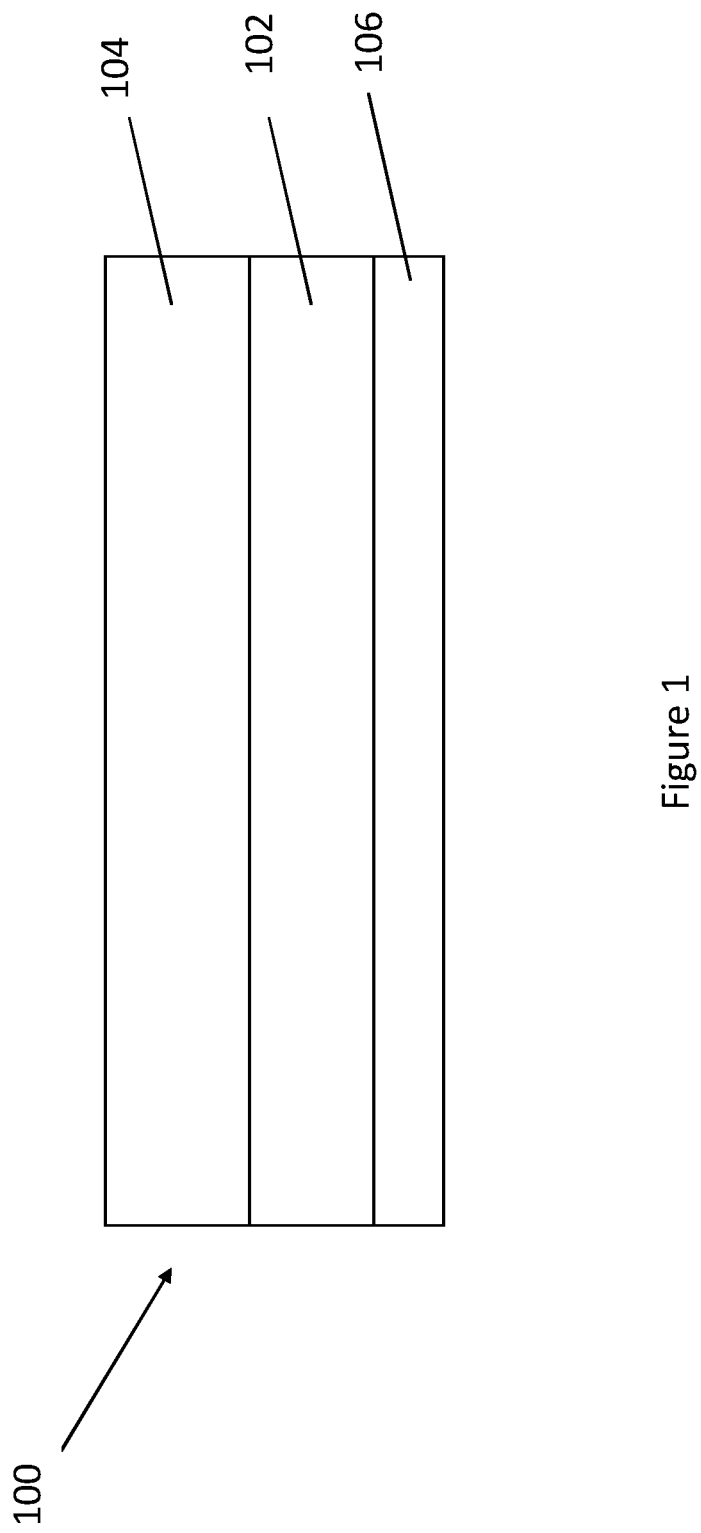

(51) Int. Cl.

| | |
|---|---|
| *B32B 5/08* | (2006.01) |
| *B32B 5/10* | (2006.01) |
| *B32B 7/09* | (2019.01) |
| *B32B 27/12* | (2006.01) |
| *B32B 27/20* | (2006.01) |
| *B32B 27/28* | (2006.01) |
| *B32B 27/30* | (2006.01) |
| *B32B 27/36* | (2006.01) |
| *B32B 27/38* | (2006.01) |
| *B32B 27/40* | (2006.01) |

(52) U.S. Cl.
CPC ............... *B32B 7/09* (2019.01); *B32B 27/12* (2013.01); *B32B 27/20* (2013.01); *B32B 27/281* (2013.01); *B32B 27/30* (2013.01); *B32B 27/36* (2013.01); *B32B 27/38* (2013.01); *B32B 27/40* (2013.01); *B32B 2260/021* (2013.01); *B32B 2260/046* (2013.01); *B32B 2262/0246* (2013.01); *B32B 2262/0253* (2013.01); *B32B 2262/0269* (2013.01); *B32B 2262/0276* (2013.01); *B32B 2262/04* (2013.01); *B32B 2262/062* (2013.01); *B32B 2262/065* (2013.01); *B32B 2262/08* (2013.01); *B32B 2262/101* (2013.01); *B32B 2262/106* (2013.01); *B32B 2262/108* (2013.01); *B32B 2262/144* (2021.05); *B32B 2307/516* (2013.01)

(58) Field of Classification Search
CPC ....... B32B 27/20; B32B 27/281; B32B 27/30; B32B 27/36; B32B 27/38; B32B 27/40; B32B 2260/021; B32B 2260/046; B32B 2262/0246; B32B 2262/0253; B32B 2262/0269; B32B 2262/0276; B32B 2262/04; B32B 2262/062; B32B 2262/065; B32B 2262/08; B32B 2262/101; B32B 2262/106; B32B 2262/108; B32B 2262/144; B32B 2307/516; B32B 5/073; B32B 7/03; B32B 2262/0261; B32B 2262/14; B32B 2264/102; Y02E 10/72; Y02P 70/50

See application file for complete search history.

(56) References Cited

FOREIGN PATENT DOCUMENTS

| | | |
|---|---|---|
| GB | 2533629 A | 6/2016 |
| WO | 2008/007094 A2 | 1/2008 |
| WO | 2014/147222 A2 | 9/2014 |
| WO | 2017/021147 A1 | 2/2017 |

OTHER PUBLICATIONS

International Search Report (ISR) and Written Opinion (WO), issued in the parent Patent Cooperation Treaty (PCT), Application No. PCT/EP2020/076515, mailed on Nov. 30, 2020.

* cited by examiner

MOULDING MATERIAL

The present invention relates to a moulding material, particularly but not exclusively to a moulding material for surface applications.

BACKGROUND

The present invention relates to moulding materials that provide enhanced surface finish, use of the moulding materials in combination with one or more preimpregnated fibrous reinforcement (prepreg) layers to form a laminate structure, use of the moulding materials in combination with dry (unimpregnated) fibre layers to form a laminate structure, and a method of forming laminate structures using the moulding materials. The present invention is particularly concerned with fibre-reinforced composite moulding materials that can be cured at low temperatures and include a surface finishing layer to provide a moulded article having a high quality surface finish that requires minimal preparation after curing, especially but not exclusively for use in the wind turbine and automotive industries.

Composite materials have well-documented advantages over traditional construction materials, particularly in providing excellent mechanical properties at very low material densities. As a result, the use of such composite materials has become widespread in many industries, including the aerospace, automotive, marine and wind turbine industries.

Prepregs, comprising a fibre arrangement impregnated with a thermosetting resin, such as epoxy resin, are widely used in the generation of such composite materials. Typically, a number of plies of such prepregs are "laid-up" as desired and the resulting assembly, or laminate, is placed in a mould and cured, usually by exposure to elevated temperatures, optionally under pressure, to produce a cured composite laminate. In an alternative manufacturing technique a fibrous material is laid up, generally within an enclosure, into which a liquid resin system can be infused to envelope the fibrous material, where it may then be cured to produce the finished article. The enclosure may be complete around the fibrous material and the resin drawn in under vacuum (sometimes known as the vacuum bag technique). Alternatively the enclosure may be a mould, and the resin may be injected into the mould (sometimes known as Resin Transfer Moulding), which may also be vacuum assisted (known as Vacuum Assisted Resin Transfer Moulding). As with the earlier described system in relation to prepregs, the liquid resin system may be an epoxy resin, a cyanate ester resin or a bismaleimide resin, and it will also contain a curative for the particular resin.

However, without any surface treatment, composite materials produced by either of the above techniques often cure to give a poor surface finish, which may manifest itself as a rough, wavy or pin-holed surface, or as narrow grooves in the surface of a moulded structure where adjacent plies of prepregs have been overlapped to ensure a continuous layer. This tendency to form an uneven surface appears to be closely linked to the coarseness of the underlying reinforcement, the problem being more pronounced the coarser the reinforcement. This can be a particular problem when coarse reinforcement is used for structural rigidity and yet a smooth surface finish is desirable, such as, for example, in the production of body panels for automobiles, where a Class A finish is required, or in the production of blades for wind turbines.

GB2445929 discloses a fibre reinforced composite moulding comprising a surface portion laminated to a structural portion, the surface portion being formed of a surfacing layer comprising a plurality of surfacing layer segments moulded together to form a continuous surfacing layer, the surfacing layer comprising a first cured resin material supported on a carrier of a sheet material, and the structural portion being formed from at least one layer of fibrous reinforcing material and a cured second resin material, at least one layer of the fibrous reinforcing material being formed of a plurality of segments each of which overlies a respective surfacing layer segment, and each surfacing layer segment overlapping an adjacent segment of the fibrous reinforcing material.

We have found that this moulding still has inferior surface quality as print-through of the underlying carrier material and fibrous reinforcing material are evident. Also the lay-up requires overlaps which in turn result in surface defects in the form of visible joint lines.

Figure 2:
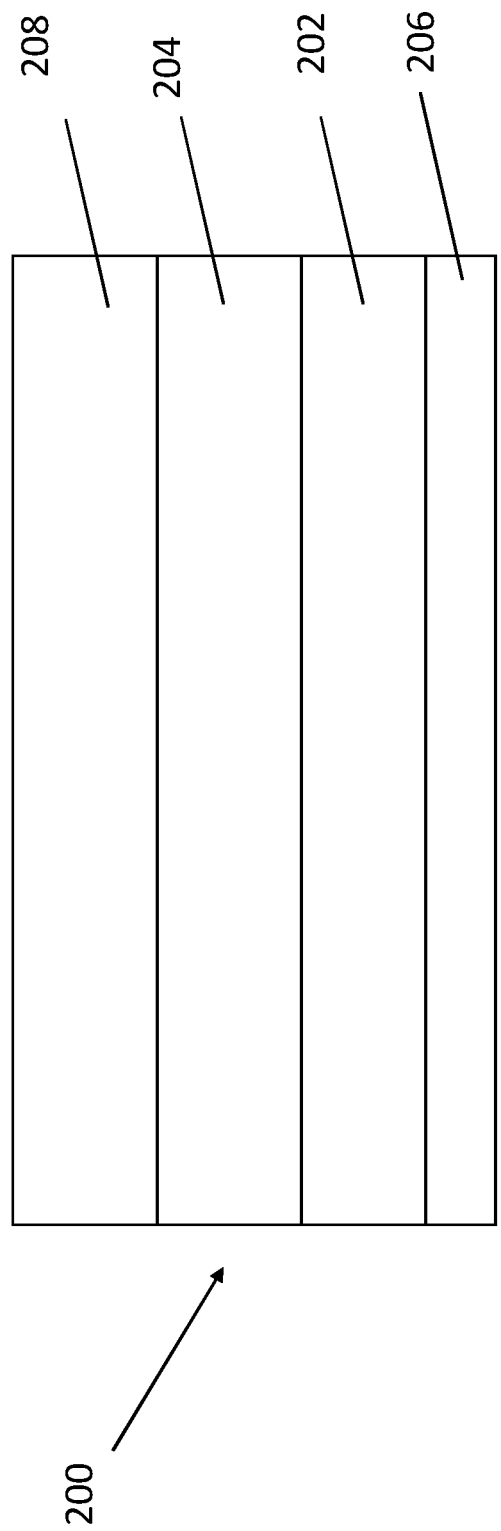

WO2008/007094 in FIG. 2 discloses a surface material which comprises a surface layer comprising a resin layer and a veil and a fleece layer. The resin layer is in contact with a mould surface and the veil is tacked thereon. The fleece contains resin strips which facilitate adhering the fleece layer to the veil leaving the fleece layer only partially impregnated with resin. This material has the problem that the resin content of the surface layers is low which require any subsequent prepreg layer to have an increased resin content. This means that prepreg materials with a significantly higher resin content than customary (typically over 60% by weight) can only be used in combination with this surface material which is complicated, inefficient and costly. Also, the manufacture of the fleece layer with resin strips is complicated and therefore inefficient and costly as conventionally reinforcement layers are impregnated over their entire surface.

WO 2017/021147 in FIG. 2 discloses a surface material which comprises a surface layer comprising a resin layer which is sandwiched between a veil and a fleece layer. The veil layer is in contact with a mould surface and the veil and fleece layer are tacked to the resin layer so that the veil and fleece layer are largely unimpregnated. This facilitates the release of any entrapped air in the lay-up near the mould surface. This material still has the problem that the resin content of the surface layers is low which require any subsequent prepreg layer to have an increased resin content which is complicated, inefficient and costly.

The present invention aims to obviate or at least mitigate the above described problems and/or to provide improvements generally.

DESCRIPTION

According to the invention there is provided a moulding material, preferably a surface material, uses of the moulding material and a method of manufacturing a laminate structure as defined in any of the accompanying claims.

The present invention provides a moulding material comprising:
 a) a primary non-woven fibre layer;
 b) A secondary non-woven fibre layer, and
 c) A resin layer;
wherein the resin layer bonds the secondary non-woven fibre layer to a first surface of the primary non-woven fibre layer, and the resin layer is exposed on the second surface of the primary non-woven fibre layer.

Surprisingly we have now found that having a resin layer exposed on the surface of the moulding material of the present invention I in combination with non-woven fibre layers provides excellent surface quality with no pin-holes. We have also found that the appearance of cosmetic defects due to print-through of carbon fibre reinforcement layers is avoided by the configuration of the moulding material of the present invention.

The materials of the present invention also provide an excellent surface finish when used as the mould or tool contacting layer when preparing laminate products employing preimpregnated reinforcement materials and/or unimpregnated reinforcement materials in prepreg or infusion systems.

Furthermore, we have found that prepreg reinforcement layers may be used with this material which have a resin content of between 30% to 45% by weight of the prepreg without having any adverse impact on the cosmetic quality of the surface. This allows the use of standard prepreg materials in combination with this moulding material in which increased resin content can be avoided.

In a particular aspect of the present invention, the moulding materials of the invention may be provided as a surface finishing layer, i.e. without any layers of reinforcement, so in this aspect the moulding materials may consist essentially of the primary non-woven fibre layer, the secondary non-woven fibre layer and the resin layer. In an alternative aspect, the moulding materials may be provided as a reinforced surface finishing layer, and in this aspect the moulding material may comprise a reinforcement layer, with the secondary non-woven layer being located between the primary non-woven fibre layer and the reinforcement layer.

SPECIFIC DESCRIPTION

Specific embodiments of the invention will now be described in more detail and by way of example as follows.

In the moulding materials of the present invention the resin layer bonds the secondary non-woven fibre layer to a first surface of the primary non-woven fibre layer, and the resin layer is exposed on the second surface of the primary non-woven layer, and therefore the primary non-woven fibre layer will generally be fully saturated by the resin layer. In addition, in certain embodiment, the secondary non-woven fibre layer at least partially impregnated, and optionally fully impregnated, with the resin of the resin layer.

In particular embodiments of the present invention, the resin layer comprises a formulated resin matrix comprising at least one resin component, at least one curative and, optionally, a filler.

The formulated resin matrix forming the resin layer which may comprise a thermosetting resin, such as a polyester resin, a polyurethane resin, a polyurethane/polyurea resin, a phenol-formaldehyde resin, a urea-formaldehyde resin, a vinyl ester resin, a cyanate ester resin, a polyimide resin or an epoxy resin. Unlike thermoplastic resins, thermosetting resins become irreversibly hardened upon curing, such that any moulded article produced therefrom is resistant to deformation. In an embodiment, the first resin composition is a thermosetting resin composition, preferably an epoxy resin composition, i.e. comprising an epoxy resin or a blend of epoxy resins.

The resin layer preferably comprises at least a multifunctional bisphenol epoxy resin material in combination with a urea-based curative. A preferred formulated resin matrix for this layer is the M79 resin as supplied by Hexcel Corporation.

In another embodiment of the invention, the formulated resin matrix comprises between 1 and 10% by weight of a filler based on the weight of the formulated resin matrix, preferably a silica filler or an organophilic phyllosilicate, preferably a fumed silica filler having a tapped density of 60 g/l. A preferred filler material is Aerosil R202 as supplied by Evonik Industries.

We have found that the inclusion of a filler reduces the flow of the resin layer which is beneficial in lay-ups which involve substantial vertical surfaces such as in the manufacture of ship and yacht hulls.

The primary and secondary non-woven fibre layers of the present preferably have the following properties and characteristics. The non-woven fibre layers may contain any non-woven material that is both air and resin permeable. Suitable non-woven fibre carriers are lightweight, preferably less than 100 g/m$^2$, but are preferably robust enough to carry a layer of resin and to withstand handling during lay-up and processing to form composite parts which have a high quality cosmetic surface.

The non-woven fibre layer may comprise continuous fibres or discontinuous fibres.

In an embodiment, the primary non-woven layer comprises a veil. In the context of the present invention, the term "veil" refers to a thin, lightweight (i.e. an areal weight of no more than 100 g/m$^2$), porous, non-woven, web or fibrous reinforcement.

In preferred embodiments, the primary non-woven layer typically consists of non-woven fibres of a thermoplastic material, preferably wherein the fibres which are bound together using an organic binder to impart structural integrity to the material. In a particular embodiment, the thermoplastic material comprises a polyester, a polyamide, preferably an aliphatic or semi-aromatic polyamide, and/or a combination of a polyester and a polyamide. The organic binder, where present, is typically present in an amount of 1 to 10% by weight based on the total weight of the primary non-woven layer.

The purpose of the primary non-woven layer is to act as a support or carrier for the resin layer, to retain resin on the exterior surface and to control the manner in which the resin interacts with the surface of a mould or tool in order to provide a good surface finish.

In an embodiment, the primary non-woven material has an openness of between 1 to 10%, preferably 2 to 89%, and/or a mean open area of between 75 to 350 μm$^2$.

In further embodiments, the primary non-woven fibre layer has an areal weight in the range of from 1 to 80 g/m$^2$, preferably from 5 to 50 g/m$^2$, more preferably from 15 to 40 g/m$^2$.

In an embodiment, the primary non-woven fibre layer has an air permeability of approximately 2,300 L/m2/s at an applied pressure of 200 Pa (as measured in accordance with ASTM D737-18). Suitable thermoplastic fibre material in the form of veils which may be used as the primary non-woven fibre layer include those commercially available under the trade name Optiveil® from Technical Fibre Products Limited, Burnside Mills, Kendal, Cumbria, United Kingdom such as Optiveil T2761-00.

Openness measurements may be made using a Keyence VHX-6000 series Digital Microscope manufactured by Keyence (UK) Limited, Milton Keynes, Buckinghamshire, United Kingdom. The non-woven material may be presented to the microscope by mounting it to a blue plastic card in order to help highlight the open areas when viewed on the computer monitor. The microscope is set at 175× magnification with the light output set to maximum and the gain dial settings adjusted so that the open areas can be clearly identified. The computer image saved represents a total area of 2951002 μm2.

The Keyence software is then used to measure the average "open area" (i.e. empty space between fibres) and the % of openness. The image is also manipulated by means of adjusting sliders on a histogram in order to create a two colour image whereby one colour represents the fibres and the other represents the open space. The software is then used to measure the areas of all the individual open spaces. This data may be saved to a spreadsheet and used to calculate the total area occupied by open spaces (in order to calculate the % openness) along with the average size of the open areas.

The secondary non-woven fibre layer may comprise a non-woven fibre material containing continuous fibres or discontinuous fibres. The secondary non-woven fibre material may comprise non-woven fibres of glass, carbon, polyester, polyamide, aramid (aromatic polyamide), or combinations thereof, which optionally are bound together using an organic binder to impart structural integrity to the material. Preferably, the secondary non-woven fibre layer comprises a glass fibre material, or a polyester material or a polyolefin polymer material and/or a combination of the aforesaid materials.

Preferably, the secondary non-woven fibre carrier comprises a non-woven glass fibre material in the form of a veil. The organic binder, where present, may typically be present in an amount of 1 to 10% by weight based on the total weight of the second non-woven fibre carrier. Generally, the secondary non-woven fibre material will be of slightly higher areal weight or surface density than the primary non-woven fibre layer. In a preferred embodiment, the secondary non-woven fibre has an areal weight in the range of from 20 to 100 $g/m^2$, more preferably in the range of from 30 to 80 $g/m^2$, more preferably in the range of from 30 to 60 $g/m^2$. Suitable non-woven glass veils, mats or fleeces are commercially available under the trade name Evalith® from Johns Manville, Denver, Colorado, USA, including but not limited to Evalith® ST-3022, S 4030 and S 5030, and under the trade name Changhai® from Taishan Fiberglass Inc., Economic Development Zone, Taian, Shandong, P.R. China, including but not limited to Changhai® S-SM30, S-SM50, S-HM30 and S-HM50.

The presence of the second non-woven fibre material helps to prevent "print-through" from the fibre reinforcement material in the structural reinforcement layer from appearing on the surface of the moulding material after curing, and also ensures that sufficient second resin composition is retained within the surface enhancing layer during cure, in order to avoid formation of narrow grooves or other surface irregularities due to resin starvation. The second non-woven fibre material, like the first non-woven fibre material, may also serve to prevent air entrapment or to assist in dissipation of entrapped air.

In a particular aspect of the present invention, the moulding material does not comprise any reinforcement materials, and the moulding material therefore consists essentially of the primary non-woven fibre layer, the secondary non-woven fibre layer and the resin layer.

In embodiments of the invention according to the first aspect in which there is no reinforcement, the total resin content of the moulding material may be contained in the resin associated with the primary non-woven layer. The preferred total resin content of the moulding materials of this embodiment will depend upon the intended use of the moulding material, but preferably the resin content of the moulding material is in the range of from 40 to 75 weight % based on the weight of the moulding material, more preferably from 50 to 60 weight % based on the weight of the moulding material.

In a second aspect of the present invention, the moulding materials of the invention comprises a reinforcement layer, the secondary non-woven fibre layer being located between the primary non-woven fibre layer and the reinforcement layer. The presence of a reinforcement layer helps to improve the moulding materials' structural integrity, which facilitates storage, transport and handling.

Preferably the secondary non-woven fibre layer is stitched to the surface of the reinforcement layer. The layer may be stitched with a polyester yarn having a tex value in the range of from 5 to 90 dtex, preferably from 40 to 85 dtex and more preferably from 70 to 85 dtex.

The structural reinforcement layer can be in many forms. Normally the moulding material according to the second aspect of the present invention will contain several structural reinforcement layers, although for some applications a single layer may suffice.

The fibrous reinforcement material may be in the form of a sheet or continuous mat or continuous filaments. In other embodiments, the fibrous reinforcement material comprises fibres of short length, for example a chopped strand mat. The fibrous reinforcement material may be in the form of multiple fibre tows each containing multiple fibre filaments to form each tow. The tows may be stitched or woven to form a fabric. The fibres may consist of natural materials, such as cotton, flax, hemp, wool or silk; or semi-synthetic materials, such as rayon, viscose, modal, etc.; or synthetic materials, such as carbon, polyester, mineral, nylon, acrylic, glass, aramid (aromatic polyamide), etc. In preferred embodiments, the fibre reinforcement comprises carbon fibres or glass fibres.

In some embodiments, the fibrous reinforcement material is in the form of a woven fabric. In other embodiments, the fibrous reinforcement material comprises a unidirectional (UD) fabric in which the majority of fibres, rovings or tows present in the fabric run in one direction only, although a small number of fibres, rovings or tows may run in a different direction to the majority, for example as cross-stitching in order to maintain the unidirectional alignment of the latter. The fibres, rovings or tows in a unidirectional fabric may be held in alignment by a number of different methods, including weaving, stitching and bonding. Consequently, such unidirectional fabrics may be woven or non-woven. In further embodiments, the fibrous reinforcement material comprises a unidirectional fabric in combination with a biaxial or multiaxial fabric or mat in which either component may be woven or non-woven.

Suitable woven and non-woven fabrics for use in composites are commercially available from specialist manufacturers including but not limited to Chomarat Textiles Industries, Esher, Surrey, United Kingdom, Hexcel Reinforcements UK Limited, Narborough, Leicestershire, United Kingdom, and Zhenshi Group Hengshi Fibreglass Fabrics Co., Ltd., Tongxiang Economic Development Zone, Jiaxing Zhejiang, 314500 China. In an embodiment, the woven or non-woven fabric is a carbon fibre or glass fibre fabric, such as BB200, BB600 or BB1200, where the designation BB1200, for example, refers to a biaxial glass fabric having an areal weight of 1200 $g/m^2$.

Hybrid or mixed fibre systems may also be envisaged. The use of cracked (i.e. stretch-broken) or selectively discontinuous fibres may be advantageous to facilitate lay-up of the moulding material according to the present invention and improve its capability of being shaped.

The areal weight of the fibrous reinforcement material is generally from 40 to 4,000 g/m². In preferred embodiments, the areal weight of fibres is preferably in the range of 100 to 2,500 g/m², more preferably 150 to 2,000 g/m².

The fibrous reinforcement material in the structural reinforcement layer, or structural reinforcement layers where more than one layer is present, will typically be a heavyweight, non-crimp fabric, such as a glass fabric. For glass reinforcements, fibres of 68 to 2400 tex (grams per kilometre of yarn) are particularly adapted.

In particular embodiments of the second aspect of the present invention, the reinforcement layer may comprise at least two layers, each containing unidirectional fibres. The unidirectional fibres of each layer may be in different directions.

In an embodiment the unidirectional fibre layers and the secondary non-woven fibre layer are stitched together, optionally using the same stitch yarn.

The reinforcement layer preferably comprises a fibrous reinforcement material and a formulated reinforcement resin matrix, and in preferred embodiments the formulated reinforcement resin matrix has the same composition as the resin of the resin layer.

In embodiments of the invention according to the second aspect in which there is a reinforcement layer, the total resin content of the moulding material may be contained in the resin associated with the primary non-woven layer, or the resin may be distributed through the material, either as a number of discrete layers throughout the material or as a single matrix. The preferred total resin content of the moulding materials of this embodiment will depend upon the intended use of the moulding material and also the weight of the reinforcement material, but preferably the resin content of the moulding material is in the range of from 5 to 60 weight % based on the weight of the moulding material. For example, in moulding materials intended to be used in infusion systems the total resin content is preferably from 5 to 50 weight %, more preferably from 5 to 20 weight %. based on the weight of the moulding material, Similarly, for moulding materials intended to be used in combination with at least partially preimpregnated materials without infusion, the total resin content is preferably from 20 to 60 weight %, more preferably from 25 to 50 weight % based on the weight of the moulding material.

The present invention further provides the use of the moulding material of the present invention in combination with one or more preimpregnated fibrous reinforcement (prepreg) layers to form a laminate structure, the prepreg layer having a resin content in the range of from 30% to 45% based on the weight of the prepreg material.

The present invention further provides the use of the moulding material of the present invention in combination with one or more resin-free (dry) layers of fibrous reinforcement to form a laminate structure in a resin infusion process.

The present invention also provides a method of manufacturing a laminate structure, the method comprising laying down a moulding material according to the present invention on the surface of a mould or tool with the layer of resin exposed on the second surface of the primary non-woven fibre layer in contact with tool or mould surface;
    applying one or more layers of resin-free (dry) fibrous reinforcement to the opposite surface of the moulding material to form a stack;
    infusing the stack with an infusion resin, and
    curing the infused stack.

In the method of manufacturing a laminate structure of the present invention, the moulding material used in the method may be a moulding material according to the first aspect of the present invention, i.e. a moulding material that does not comprise a reinforcement layer. Alternatively, the moulding material may be a moulding material of the second aspect of the present invention, i.e. a moulding material comprising a reinforcement layer, and particularly a moulding material comprising a reinforcement layer and in which the resin content of the moulding material is in the range of from 5 to 50 weight %, preferably in the range of from 5 to 20 weight %, based on the weight of the moulding material.

In the method of manufacturing a laminate structure according to the present invention, at least one layer of preimpregnated fibrous reinforcement (prepreg) may be included in the stack before infusion with the resin.

In the method of manufacturing a laminate structure according to the present invention any conventional infusion process and infusion resins may be used, depending upon the intended use of the laminate structure.

DRAWINGS

The invention will now be described by way of example only and with reference to the accompanying drawings.

FIG. 1 presents a diagrammatic view of a moulding material according an embodiment of the present invention, and;

FIG. 2 presents a diagrammatic view of another moulding material according to another embodiment of the invention.

In FIG. 1 a moulding material 100 is shown which comprises a primary non-woven fibre layer 102 and a secondary non-woven fibre layer 104. The primary non-woven fibre layer 102 contains a resin layer 106 which is exposed on its surface but extends throughout the primary non-woven fibre layer 102 and at least contacts, and optionally extends partially or fully into, the secondary non-woven fibre layer 104. The primary and secondary non-woven fibre layers 102, 104 are bonded by the tack of the resin layer 106.

In a particular embodiment, the primary non-woven layer 102 is a non-woven thermoplastic veil containing a blend of polyamide and polyester material having a weight of 15 g/m²; the resin layer 106 has a weight of 65 g/m², and the secondary non-woven fibre layer 104 is a glass fibre material fleece having a weight of 50 g/m².

In a typical use, the moulding material 100 is located in contact with a mould surface with the upper surface of the resin layer 106 in contact with the mould. Additional at least partially resin preimpregnated reinforcement layers may be located on top of the moulding material 100, i.e. in contact with the secondary non-woven layer 104 to build a composite lay-up which is then subsequently cured to produce a composite part. In an alternative use, the moulding material 100 is located in contact with a tool surface with the upper surface of the resin layer 106 in contact with the tool. Additional unimpregnated (i.e. dry) reinforcement layers may be located on top of the moulding material 100, i.e. in contact with the secondary non-woven layer 104 to build a composite lay-up which is then subsequently infused with resin and cured to produce a composite part.

In FIG. 2 a moulding material 200 is shown which comprises a primary non-woven fibre layer 202 and a secondary non-woven fibre layer 204. The primary non-woven fibre 202 layer contains a resin layer 206 which is exposed on its surface and extends throughout the primary non-woven fibre layer 202 and at least contacts, and optionally extends partially or fully into, the secondary non-woven fibre layer 204. A fibrous reinforcement layer 208 is located on the opposite surface of the secondary non-woven layer 204. The primary and secondary non-woven fibre layers 202, 204 are bonded by the tack of the resin layer 206, and the secondary non-woven fibre layer 204 and the reinforcement layer 208 are bonded by stitching. This allows the reinforcement layer 208 to remain unimpregnated with resin (dry).

In a particular embodiment, the resin composition contains a difunctional epoxy in combination with a urea-based curative; the primary non-woven fibre layer 202 is a non-woven polyester veil having a weight of 15 g/m$^2$; the resin layer 206 has a weight of 140 g/m$^2$, and the secondary non-woven fibre layer 204 is a glass fibre fleece having a weight of 50 g/m$^2$.

In a preferred embodiment, the reinforcement layer 208 is preferably in the form of two layers of unidirectional fibre combined to form a biaxial layer, preferably having an orientation +/−45 degrees.

In typical use, the moulding material 200 is located in contact with a mould surface with the upper surface of the resin layer 206 in contact with the mould. Additional reinforcement layers are located on top of the moulding material 200 to build a composite lay-up, which is then subsequently cured to produce a composite part. In an alternative use, the moulding material 200 is located in contact with a tool surface with the upper surface of the resin layer 206 in contact with the tool. Additional unimpregnated (i.e. dry) reinforcement layers may be located on top of the moulding material 200, i.e. in contact with the secondary non-woven layer 204 to build a composite lay-up which is then subsequently infused with resin and cured to produce a composite part There is thus provided a moulding material which can be used in combination with preimpregnated fibrous reinforcement (prepreg) layers which have a resin content in the range of from 30% to 45% by weight based on the weight of the prepreg, and which can also be used in combination with unimpregnated fibrous reinforcement layers to form a laminate in an infusion system.

EXAMPLES

Example 1

A resin composition (composition 1) was formulated from:
- 72.9 g Kukdo KFR136SL, a semi-solid bisphenol A diglycidyl ether epoxy resin manufactured by Kukdo Chemical Company Limited, Seoul, Korea);
- 18.2 g Epikote® 828 (a liquid bisphenol A diglycidyl ether epoxy resin manufactured by Hexion Inc., Columbus, Ohio, USA);
- 2.9 g Dyhard® UR500 (a difunctional latent urone accelerator in powder form manufactured by Alzchem Group AG, Trostberg, Germany).

The components were mixed thoroughly at a temperature of 50 to 60° C. until the mixture was uniform in consistency.

A moulding material was constructed having the following architecture:
(1) a layer of Evalith® S 5030 (a glass fibre fleece having an areal weight of 50 g/m$^2$ manufactured by Johns Manville, Denver, Colorado, USA,);
(2) a layer of a lightweight, fully synthetic non-woven fibre veil comprising a blend of polyester and polyamide fibres having an areal weight of 15 g/m$^2$ (manufactured by Technical Fibre Products Limited, Burnside Mills, Kendal, Cumbria, United Kingdom); and
(3) a 65 g/m$^2$ layer of resin composition 1.

The assembled layers were consolidated by passing through an S-wrap roller system heated to 80° C., to a form moulding material corresponding to moulding material 100 shown in FIG. 1.

A composite part was produced by placing the moulding material 100 into a composite tool treated with Zyvax® Watershield™ (a silicone-free water-soluble mould release agent manufactured by Freeman Manufacturing and Supply Company, Avon, Ohio, USA), followed by 3 layers of BB1000 fabric, (1000 g/m$^2$ biaxial non-crimp glass fabric manufactured by Hexcel Reinforcements UK Limited, Narborough, Leicestershire, United Kingdom) and 1 layer of Bleeder Lease B (62 g/m$^2$ silicone treat nylon fabric from Airtech Europe Sarl, Differdange, Luxembourg.) and infused with Hexion RIM R135/RIM H 137 (liquid epoxy resin and hardener combination from Hexion Inc., Columbus, Ohio, USA) before curing at 80° C. for 6 hours under 1 bar pressure.

On cooling, the cured moulded part was removed for inspection and further testing.

Example 2

A resin composition (composition 2) was formulated from the same components in the same amounts as composition 1, but with the addition of 6 g Aerosil® R202 (a hydrophobic fumed silica rheology modifier manufactured by Evonik Resource Efficiency GmbH, Hanau-Wolfgang, Germany.

The components were mixed thoroughly at a temperature of 50 to 60° C. until the mixture was uniform in consistency.

A moulding material was constructed having the following architecture:
(1) a layer of LBB1200 fabric (1250 g/m$^2$ triaxial non-crimp glass fabric manufactured by Hexcel Reinforcements UK Limited, Narborough, Leicestershire, United Kingdom);
(2) a layer of Evalith® S 5030 (a glass fibre fleece having an areal weight of 50 g/m$^2$ manufactured by Johns Manville, Denver, Colorado, USA,);
(3) a layer of a lightweight, fully synthetic non-woven fibre veil comprising a blend of polyester and polyamide fibres having an areal weight of 15 g/m$^2$ (manufactured by Technical Fibre Products Limited, Burnside Mills, Kendal, Cumbria, United Kingdom); and
(4) a 140 g/m$^2$ layer of resin composition 2.

The assembled layers were consolidated by passing through an S-wrap roller system heated to 80° C., to form a moulding material corresponding to moulding material 200 shown in FIG. 2.

A composite part was produced by placing the moulding material 1 into a composite tool treated with Zyvax® Watershield™ (a silicone-free water-soluble mould release agent manufactured by Freeman Manufacturing and Supply Company, Avon, Ohio, USA), followed by 3 layers of BB1000 fabric, (1000 g/m$^2$ biaxial non-crimp glass fabric manufactured by Hexcel Reinforcements UK Limited, Narborough, Leicestershire, United Kingdom) and 1 layer of Bleeder Lease B (62 g/m$^2$ silicone treat nylon fabric from Airtech Europe Sarl, Differdange, Luxembourg.) and infused with Hexion RIM R135/RIM H 137 (liquid epoxy resin and hardener combination from Hexion Inc., Columbus, Ohio, USA) before curing at 80° C. for 6 hours under 1 bar pressure.

On cooling, the cured moulded part was removed for inspection and further testing.

Example 3

Resin composition 2 was used to form a moulding material having the following architecture:
(1) a 400 g/m² layer of resin composition 2;
(2) a layer of LBB1200 fabric (1250 g/m² triaxial non-crimp glass fabric (manufactured by Hexcel Reinforcements UK Limited, Narborough, Leicestershire, United Kingdom);
(3) a layer of Evalith® S 5030 (a glass fibre fleece having an areal weight of 50 g/m² manufactured by Johns Manville, Denver, Colorado, USA,);
(4) a layer of a lightweight, fully synthetic non-woven fibre veil comprising a blend of polyester and polyamide fibres having an areal weight of 15 g/m² manufactured by Technical Fibre Products Limited, Burnside Mills, Kendal, Cumbria, United Kingdom); and
(5) a 400 g/m² layer of resin composition 2.

The assembled layers were consolidated by passing through an S-wrap roller system heated to 80° C., to form a moulding material corresponding to moulding material 200 shown in FIG. 2

The moulding material 200 was placed into a composite tool treated with Zyvax® Watershield™ (a silicone-free water soluble mould release agent manufactured by Freeman Manufacturing and Supply Company, Avon, Ohio, USA) with the resin composition layer (5) adjacent to the face of the mould. Two layers of HexPly® 79 (a prepreg manufactured by Hexcel GmbH, Neumarkt, Germany) were placed on top of the moulding material in the mould, i.e. next to the resin layer (1); and the assembly was cured under vacuum for 6 hours at 80° C. and 1 bar pressure. On cooling, the cured moulded part was removed for inspection and further testing.

The invention claimed is:

1. A moulding material comprising:
a) a primary non-woven fibre layer, said primary non-woven fibre layer having an upper and a lower face, said primary non-woven layer comprising a polyester or an aliphatic or semi-aromatic polyamide fibre material, having an areal weight of 10 to 40 g/m², said primary non-woven fibre layer having an openness of 1 to 10% and a mean open area of 75 to 350 micron², said primary non-woven fibre layer being fully saturated by resin; wherein said primary non-woven fibre layer has an air permeability of approximately 2,300 L/m2/s at an applied pressure of 200 Pa as measured in accordance with ASTM D737-18;
b) a secondary non-woven fibre layer, said secondary non-woven fibre layer having an upper and a lower face, said secondary non-woven fibre layer comprising glass fibre material, polyolefin polymer material, or a combination of said materials, and having an areal weight of 30 to 60 g/m²;
c) a fibrous reinforcement layer, said fibrous reinforcement layer having a upper and lower face; the lower face of said fibrous reinforcement layer being stitched to the upper surface of the secondary fibre layer, whereby said fibrous reinforcement layer does not include resin; said reinforcement layer comprising at least two layers of unidirectional fibres, each layer of unidirectional fibres being disposed in different directions; said layers of said reinforcement layer being stitched together; wherein the fibres of said layers of unidirectional fibres of said reinforcement layer are of 68 to 2400 tex; and
d) a resin layer, said resin layer comprising at least one resin component, at least one curative and at least one silica filler; wherein said resin layer is conjoined to the lower face of said primary non-woven fibre layer and the lower face of said secondary non-woven fibre layer is conjoined to the upper face of said primary non-woven fibre layer; and wherein said resin layer impregnates at least partially said primary non-woven fibre layer and partially impregnates said secondary non-woven fibre layer; but said resin does not impregnate said fibrous layer of said moulding material, whereby said moulding material comprises 25 to 50% by weight resin;
wherein the resin layer bonds the secondary non-woven fibre layer to the upper surface of the primary non-woven fibre layer, and the resin layer is exposed on the lower surface of the primary non-woven layer, whereby said moulding material, upon curing, provides an excellent surface quality with substantially no pin-holes and substantially no print-through.

2. A method of manufacturing a laminate structure, the method comprising laying down a moulding material according to claim 1 on the surface of a mould or tool with the layer of resin exposed on the lower surface of the primary non-woven fibre layer in contact with tool or mould surface;
applying one or more layers of resin-free (dry) fibrous reinforcement to the opposite surface of the moulding material to form a stack;
infusing the stack with an infusion resin, and curing the infused stack.

3. The method of claim 2, wherein at least one layer of preimpregnated fibrous reinforcement (prepreg) is included in the stack before infusion with the resin.

* * * * *